(12) United States Patent
Völker et al.

(10) Patent No.: US 9,658,407 B2
(45) Date of Patent: May 23, 2017

(54) OPTICAL CONNECTOR ASSEMBLY

(71) Applicant: HUBER+SUHNER AG, Herisau (CH)

(72) Inventors: Michael Lothar Völker, Sax (CH); Daniel Greub, St. Gallen (CH)

(73) Assignee: Huber+Suhner AG, Herisau (CH)

( * ) Notice: Subject to any disclaimer, the term of this patent is extended or adjusted under 35 U.S.C. 154(b) by 0 days.

(21) Appl. No.: 14/784,823

(22) PCT Filed: Apr. 15, 2014

(86) PCT No.: PCT/EP2014/057589
§ 371 (c)(1),
(2) Date: Oct. 15, 2015

(87) PCT Pub. No.: WO2014/170307
PCT Pub. Date: Oct. 23, 2014

(65) Prior Publication Data
US 2016/0085035 A1    Mar. 24, 2016

(30) Foreign Application Priority Data

Apr. 15, 2013   (CH) .................................. 00774/13

(51) Int. Cl.
G02B 6/38    (2006.01)
(52) U.S. Cl.
CPC ........... *G02B 6/3874* (2013.01); *G02B 6/381* (2013.01); *G02B 6/3821* (2013.01); *G02B 6/3825* (2013.01); *G02B 6/3869* (2013.01); *G02B 6/3882* (2013.01); *G02B 6/3893* (2013.01)

(58) Field of Classification Search
CPC .... G02B 6/3874; G02B 6/381; G02B 6/3821; G02B 6/3825; G02B 6/3869; G02B 6/3893; G02B 6/3894; G02B 6/3885
See application file for complete search history.

(56) References Cited

U.S. PATENT DOCUMENTS

| 4,478,487 | A |   | 10/1984 | Obeissart |   |
|---|---|---|---|---|---|
| 4,759,599 | A |   | 7/1988 | Yamaguchi et al. |   |
| 4,872,736 | A | * | 10/1989 | Myers ................. | G02B 6/3878 385/60 |
| 5,125,056 | A | * | 6/1992 | Hughes ............... | G02B 6/3816 385/59 |
| 5,337,386 | A | * | 8/1994 | Noll ..................... | G02B 6/3893 385/60 |
| 5,608,828 | A |   | 3/1997 | Coutts et al. |   |
| 6,085,003 | A |   | 7/2000 | Knight |   |
| 6,206,579 | B1 | * | 3/2001 | Selfridge ............ | G02B 6/3869 385/53 |
| 6,412,988 | B1 |   | 7/2002 | Dean, Jr. et al. |   |

(Continued)

FOREIGN PATENT DOCUMENTS

| EP | 0 936 464 A1 | 8/1999 |
|---|---|---|
| EP | 0 996 009 A1 | 4/2000 |

(Continued)

*Primary Examiner* — Rhonda Peace
(74) *Attorney, Agent, or Firm* — Pauley Erickson & Kottis

(57) ABSTRACT

An optical connector assembly (1) includes a plug (2) and a socket (3) which are interconnectable to each other in an axial direction (x). The plug (2) comprises a plug housing (5) in which a first ferrule (7) is arranged and the socket (3) comprises a socket housing (20), in which a second ferrule (23) is arranged.

12 Claims, 4 Drawing Sheets

(56) References Cited

U.S. PATENT DOCUMENTS

| | | | |
|---|---|---|---|
| 6,454,464 B1 | 9/2002 | Nolan | |
| 6,811,322 B2 * | 11/2004 | Chen | G02B 6/3869 385/53 |
| 7,686,519 B2 | 3/2010 | Lu | |
| 7,988,368 B2 * | 8/2011 | Sakurai | G02B 6/3821 385/60 |
| 8,851,765 B2 * | 10/2014 | Larson | G02B 6/3818 385/139 |
| 2002/0186931 A1 | 12/2002 | Seo et al. | |
| 2009/0052844 A1 | 2/2009 | Van Der Steen | |
| 2016/0085035 A1 * | 3/2016 | Volker | G02B 6/3893 385/60 |

FOREIGN PATENT DOCUMENTS

| | | |
|---|---|---|
| GB | 2472584 A | 2/2011 |
| WO | WO 2006/040126 A1 | 4/2006 |

* cited by examiner

OPTICAL CONNECTOR ASSEMBLY

BACKGROUND OF THE INVENTION

Field of the Invention

The present invention relates to an optical connector assembly for at least two optical fibers.

Discussion of Related Art

From the prior art optical connectors are known for connection of one or several optical fibers. Some connectors comprise means to compensate a misalignment of the optical fibers inside of the connectors.

U.S. Pat. No. 4,759,599A assigned to Toshiba Corp. was first published in July 1988. It is directed to an optical connector, which includes a plug and an adaptor to which the plug is to be connected. A floating holder is arranged in the plug body to be movable in any direction with respect to the plug body. An end of the optical fiber of the cable is attached to a ferrule which is supported by the holder. When the plug is connected to the adaptor, the plug body is fitted to the plug body fitting portion and the holder to the holder fitting portion. At this time, the plug body is locked to the plug body fitting portion by a lock mechanism, and the holder is locked to the holder fitting portion by engaging projections on the holder and engaging holes which are formed in the holder fitting portion and engaged with the projections.

US2009052844A assigned to Framatome Connectors Int. was first published in April 2006. It is directed to a fiber optical connector with a floating ferrule. A ferrule for fixating at least one optical fiber is disposed in said passageway, said ferrule having a front part, associated with a mating side of a housing, and a back part, associate with a rear side of said housing. The ferrule is arranged in said housing such that the back part of the ferrule is permitted to move transversely to the longitudinal axis to a larger extent than the front part of the ferrule.

U.S. Pat. No. 6,412,988B assigned to Corning Cable Systems was first published in August 2001. It is directed to a fiber optic connector with a ferrule that defines a shoulder having curved corners. Thereby the fiber optic connector allows the ferrule to float within the internal cavity defined by the connector housing without becoming dislodged and assuming a cocked position within the internal cavity.

US2002186931A assigned to Furukawa Electric Co. Ltd. was first published in October 2002. It is directed to a housing for an optical connector and an optical connector. The position of a ferrule which has been accommodated in the housing is uniquely determined within the housing before connection to a mating ferrule. After connection to the mating ferrule, the ferrule is put in a floating condition in the housing.

U.S. Pat. No. 6,454,464B assigned to Crafts Inc. Comp. was first published in September 2002. It describes a fiber optic connector with a male, which has a ferrule fixed to the housing. Ferrule-to-ferrule alignment is provided by the floating ferrule in the mating female connector.

U.S. Pat. No. 7,686,519B assigned to ADC Telecommunications Inc. was first published in June 2007. It is directed to a female fiber optic connector, which includes an outer housing, a single internal male fiber optic connector and a fiber optic adapter. The outer housing has a first end, which receives a fiber optic cable, positioned opposite from a second end, which defines a connector port for receiving an external male connector. The fiber optic adapter is positioned within the outer housing and includes an alignment sleeve and being configured so that a ferrule of the external male connector fits within the alignment sleeve when inserted in the connector port.

EP0996009A1 assigned to Interlemo Holding SA was first published in April 2000. It describes a connector system which comprises a standard DI N 41 61 2 two-part connector for printed circuit boards having a plug shell inserted into a socket shell. An alignment sleeve is placed in a floating condition in a housing formed in the front plug shell insert. The alignment sleeve allows front to front aligned housing of the ferrules of two fibre optic male contacts.

U.S. Pat. No. 5,608,828A assigned to ITT Corp. was first published in March 1997. It describes a fiber optic connector which has an alignment sleeve for surrounding fiber-holding ferrules. The sleeve can deflect to receive a slightly misaligned mating ferrule. The sleeve is expandable in diameter and is contained in a hood that surrounds the sleeve and that forms front and rear shoulders. The hood loosely surrounds the sleeve and the hood is loosely contained in a connector housing passage to facilitate reception of a slightly misaligned mating ferrule.

EP0936484A1 assigned to Nippon Telegraph and Telephone Corp. was first published in March 1999. It describes an optical connector structured having an optical connector ferrule accommodated in a housing urged towards the butt connection direction by an urging means. When the optical connector ferrule is moved towards the butt, the stop guard is accommodated in the positioning support part and positioned and supported. When the stop guard is released from the positioning support part, floating of the optical connector ferrule in the housing is permitted.

U.S. Pat. No. 6,085,003A assigned to US Conec Ltd. was first published in January 2000. It describes a fiber optic connector, which includes a free floating ferrule so as to reliably withstand significant side-pull forces. In order to permit the ferrule to be free floating, the fiber optic connector can provide increased clearance or spacing between the combination of the ferrule and the pin clamp and the connector housing. The inner sidewalls of the forward end of the connector housing may have either a bevelled or a stepped profile in longitudinal cross-section so as to provide additional clearance at the forward portion of the ferrule.

The connectors known from the prior art are often complicated and not sufficient reliable over time. It is therefore an object of the invention to provide a competitive and reliable connector which can easily be assembled, tested and operated.

SUMMARY OF THE INVENTION

In difference to the prior art an optical connector assembly (plug and mating connector or individual parts to be used in the optical connector assembly) according to the herein disclosed invention provides a simple, robust and cost effective design. In general it comprises a plug and a socket which are interconnectable to each other in an axial direction. The plug comprises a plug housing in which a first ferrule is arranged and the socket comprises a socket housing, in which a second ferrule is arranged. At least one of the ferrules is arranged deflectable in the axial direction against the force of a spring. At least one of the ferrules is arranged deflectable and/or swivelling in a lateral direction with respect to the connector axis (longitudinal direction).

In general first and second alignment features are present for alignment of the ferrules with respect to each other during mating of the plug and the socket. Normally the first alignment features are foreseen for coarse alignment of the ferrules with respect to each other in a first step. The second alignment features for fine alignment of the ferrules with respect to each other in a second step. Good results may be achieved if the alignment feature for coarse alignment has an at least partially funnel shaped mouth opening. The alignment feature for fine alignment may comprise at least one guiding pin and at least one corresponding guiding opening. In lateral direction the alignment feature for fine alignment may be arranged inside the alignment feature for coarse alignment. In axial direction the alignment feature for fine alignment is in plugging direction preferably arranged behind the alignment feature for coarse alignment. Thereby it is achieved that the alignment features for coarse alignment engage with each other before the alignment features for fine alignment are activated. Normally the alignment features for coarse alignment and the alignment features for fine alignment are arranged rigid with respect to each other and their related ferrule.

In an embodiment of the invention the laterally deflectable ferrule is held by a deflectable holding sleeve which is e.g. comprises or is made out of an energy absorbing deformable material, such as rubber or foam. Alternatively or in addition the holding sleeve is designed as a deformable structure comprising one or several spring elements or deformable structures which allow deformation in the required one or several directions for alignment purpose. A holding sleeve as described above provides the advantage that external influences such as e.g. dynamic stress or vibrations are effectively absorbed by the material and thereby the propagation of the signal is improved.

While the housing of the plug and the socket are preferably made out of metal or another suitable material, the holding sleeve is preferably made by injection molding of plastic material. The holding sleeve may be made as one or several parts.

In a preferred embodiment at least one ferrule is supported from behind by a crimp neck directly or indirectly. If appropriate a spring may be arranged between the crimp neck and the ferrule supporting the ferrule with respect to the crimp neck. Depending on the field of application the spring can be supported by another feature.

In a preferred embodiment the socket comprises a locking rim and the plug comprises a locking ring which engages behind the locking rim during coupling of the plug and the socket. Alternative or in addition a threaded or a bayonet type connection can be foreseen to interconnect and securely lock the housings of the plug and the socket with respect to each other.

At least one crimp neck may have a two part form comprising an upper and a lower part which mate with each other. During assembly of the connector the upper and the lower part are assembled around an optical cable and secured by a crimp sleeve which is crimped onto the crimp neck.

A connector according to the invention offers a high channel density and a rapid connection. It can e.g. be used in connection with radio remote heads (RRH) in mobile base stations.

BRIEF DESCRIPTION OF THE DRAWINGS

The herein described invention will be more fully understood from the detailed description given herein below and the accompanying drawings which should not be considered limiting to the invention described in the appended claims. The drawings are showing:

DETAILED DESCRIPTION OF THE INVENTION

Figure 1:
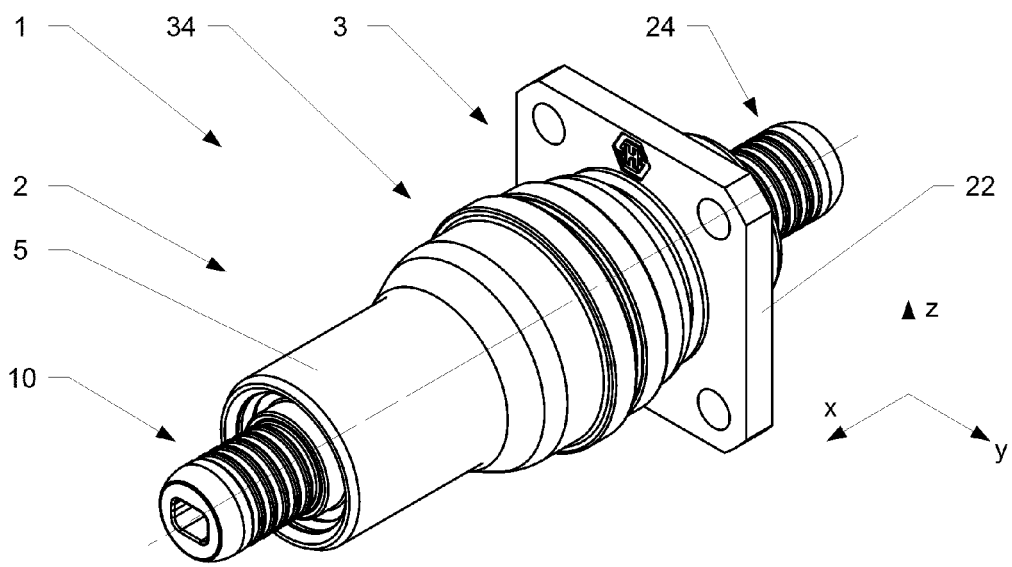
FIG. 1 is a first embodiment of a plug and a socket according to the invention in a perspective view.

FIG. 1 shows a connector assembly 1 according to the present invention comprising a plug 2 and a socket 3. The plug 2 and the socket 3 are shown in a coupled manner interconnected to each other.

Figure 2:
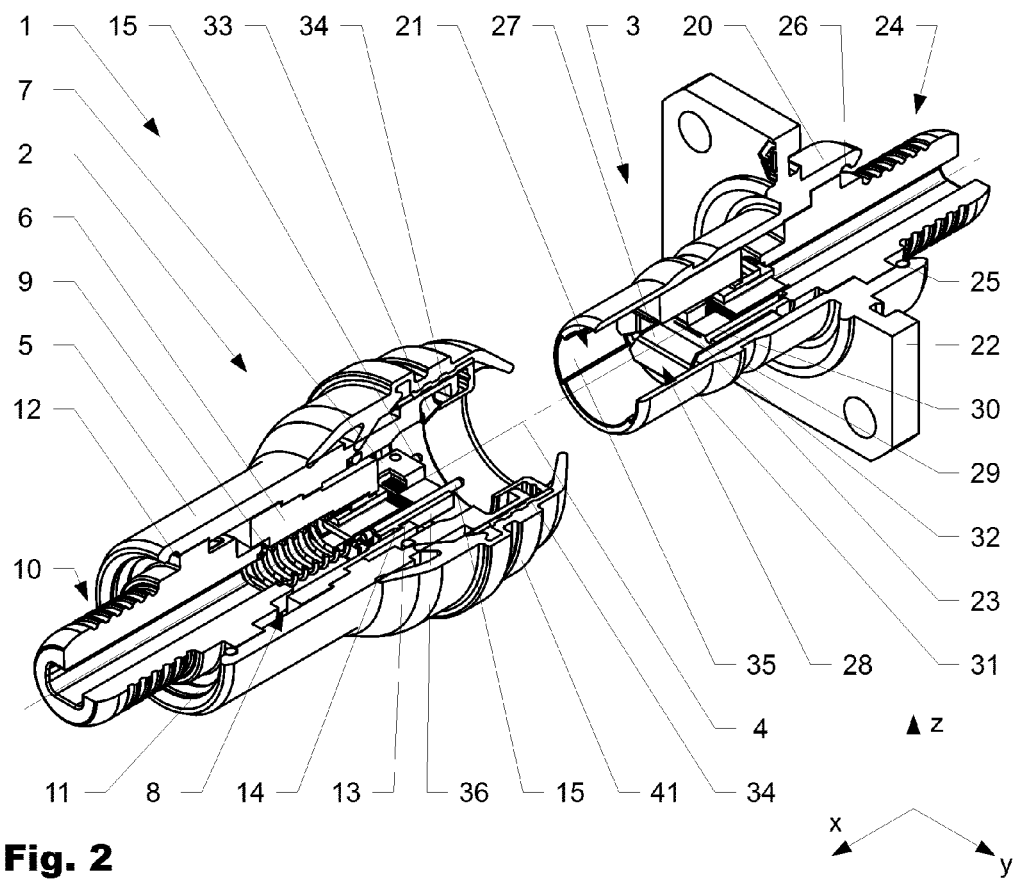
FIG. 2 is the plug and the socket according to FIG. 1 in a partially cut manner.

FIG. 2 is showing the assembly according to FIG. 1 in a disassembled and partially cut manner, such that the inside of the plug 2 and the socket 3 become visible.

Figure 3:
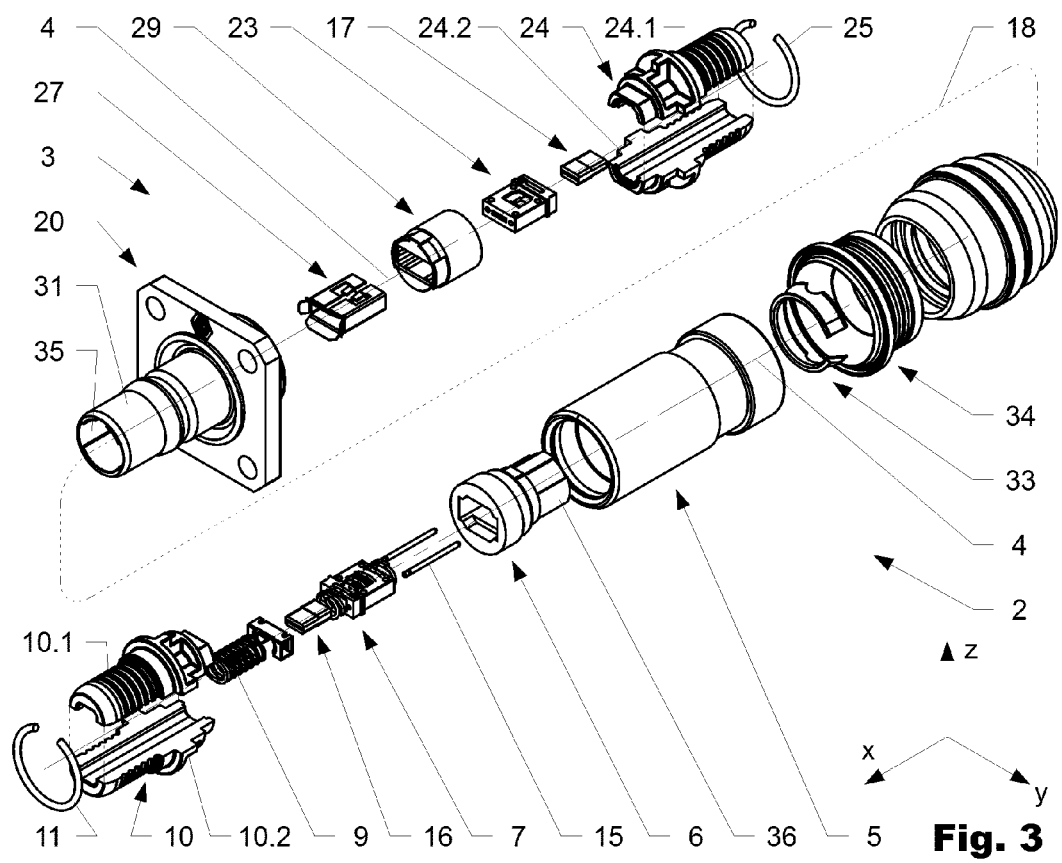
FIG. 3 is the plug and the socket according to FIG. 1 in an exploded view.

FIG. 3 is showing an exploded view of the first embodiment of the connector assembly 1 in perspective manner.

Figure 4:
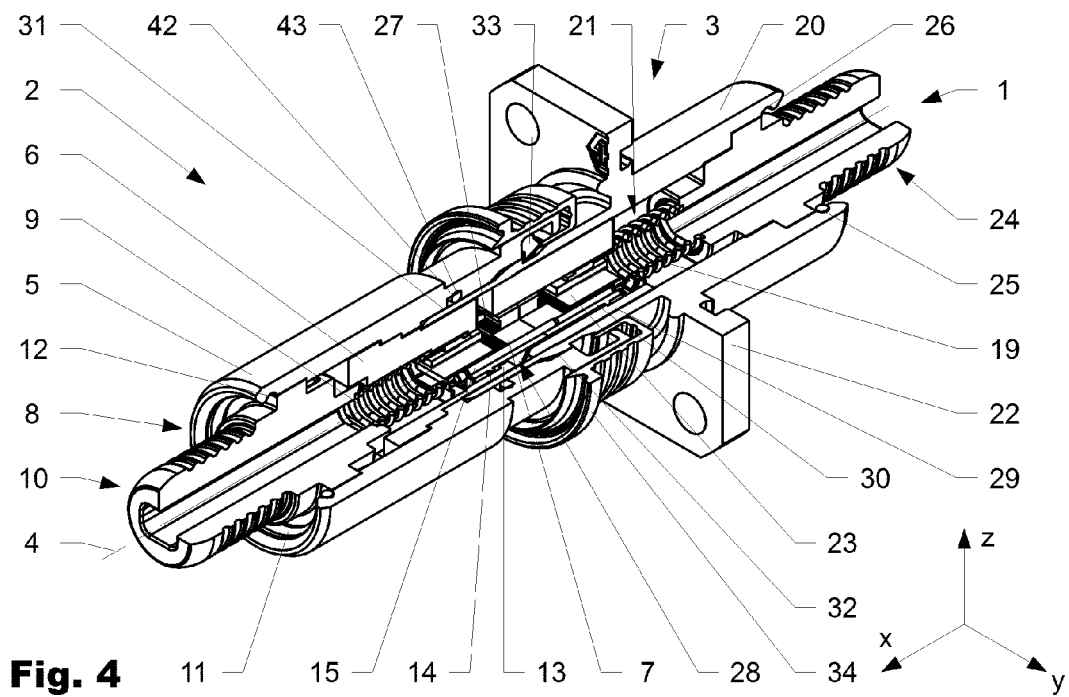
FIG. 4 is a second embodiment of a plug and a socket according to the invention in a perspective view and partially cut.

FIG. 4 is showing a second embodiment of a connector assembly 1 according to the present invention. The plug 2 and the socket 3 are interconnected to each other along a connector axis 4.

The plug 2 comprises in the shown embodiments a plug housing (housing of plug) 5 having an opening 8 extending in axial direction (x-direction) inside which a first retainer 6 is arranged.

A first ferrule 7 is arranged displaceable in axial direction against the force of a first spring 9. The termini retainer 6 is acting as a guiding means for the first ferrule 7 during axial displacement. On the rear end the spring 9 is supported directly or indirectly by a first crimp neck 10 which is inserted into or attached to the plug housing from the rear end. In the shown embodiment, the first crimp neck 10 is fixed by a first retainer ring 11, which in a mounted position is snapped into a first groove 12 of the first plug housing.

The first spring 9 presses a lateral projection 13 of the first ferrule 7 against a shoulder 14 of the first retainer 6, which is arranged in an inward direction. The shoulder 14 acts as a stop for the first ferrule 7 and prevents that the first ferrule 7 falls out of the plug housing 5. At the front end, the first ferrule 7 comprises in the shown embodiment two guiding pins 15 help to align the ferrule 7 with respect to its counterpart arranged in the socket 3 as described in detail subsequent. In the shown embodiment the first retainer 6 is made out of a rigid material. It is designed to support and hold the first ferrule 7 such that it is displaceable in axial direction.

The socket 3 comprises a socket housing 20 with an opening 21 which extends in axial direction. In the shown embodiments, the socket housing 20 comprises a mounting plate 22 by which the socket 3 can be fixed e.g. to a housing of a device (not shown in detail). Inside the opening 21 a second ferrule 23 is arranged in a laterally deflectable (y, z-direction) and/or respectively swivelling manner as described herein. The support is designed such that the second ferrule 23 can adjust while coupling of the plug 2 and the socket 3 to the orientation and position of the first ferrule 7 arranged in the plug 2. Inverse arrangement is possible.

In the shown embodiment, the ferrules 7, 23 are both sides multi-channel ferrules with high channel density, which match to each other, i.e. the multi-channel ferrules 7, 23 hold and support several optical fibers, e.g. 2, 6 or 12 or any other number (not shown in detail), and guarantee that the optical fibers are precisely connected to each other when the plug 2 and the socket 3 are interconnected.

In the socket 3, the second ferrule 23 is supported from behind directly or indirectly by a second crimp neck 24. In the shown embodiment, the second crimp neck 24 is inserted from the rear end into the opening 21 of the socket housing 20 and which is secured by a second retainer ring 25 arranged in a second groove 26. The bearing of the second ferrule 23 is such that especially during coupling a certain misalignment between the first and the second ferrule 7, 23 can be compensated in that the second ferrule can deflect and/or swivel inside of the socket housing 20 in a certain range. Longitudinal adjustment and the necessary contact pressure between the first and the second ferrule 7, 23 is achieved in that at least one ferrule is arranged displaceable against the force of a spring 9.

The bearing of the second ferrule 23 is in the shown embodiment achieved as follows: The second ferrule 23 is in the mounted position encompassed by an alignment sleeve 27, which here is made out of punched and bend sheet metal. The alignment sleeve 27 has a rectangular funnel shaped mouth opening 28 and is arranged in a holding sleeve 29 e.g. made out of an elastic material, such as rubber and/or foam. The holding sleeve 29 acts as a retainer for the second ferrule 23. The mouth opening 28 can e.g. have a round or any other shape if required.

The necessary flexibility of the holding sleeve 29 can be achieved alternatively or in addition by the structure of the holding sleeve 29. The holding sleeve 29 may be made as one piece or consist out of several pieces/elements. E.g. the holding sleeve 29 may comprise one or more spring elements, which help to position and align the ferrules 7, 23 during operation. The holding sleeve as described above, especially when comprising elements made out of rubber and/or foam, provides the advantage that external influences such as e.g. dynamic stress or vibrations are effectively absorbed and thereby the propagation of the signal is improved.

In the embodiment shown in FIGS. 1 to 3 the back end of the second ferrule 23 is supported by the second crimp neck 24 thereby preventing unwanted displacement in axial direction. However lateral movement is not influenced in a negative manner.

The second ferrule 23 comprises at a front side two guiding holes 30, which during coupling of the connector parts 2, 3 the guiding pins 15 at a front of the first ferrule 7 are inserted.

The socket housing 20 comprises a cylindrical tubular section 31 which on the outside comprises a retaining means, herein in the form of a locking rim 32. In the present embodiment, the locking rim 32 is with respect to the longitudinal direction arranged on the same level as the second ferrule 23.

The opening 8 of the plug housing 5 is at the front end shaped such that it is suitable to receive and precisely match to the tubular section 31 of the socket 3. The plug 2 further comprises an expandable locking ring 33, which in a locked position as shown in FIGS. 1 and 4 interact with the locking rim 32 of the socket 2. The locking ring 33 is radially expandable and engages behind the locking rim 32 when the plug 2 is inserted into the socket 3. To disengage the plug 2 from the socket 3 an bushing 34 is foreseen, which reaches into the opening 8 of the plug 2 where it may interact with the locking ring 33 for unlocking purpose. The present bushing 34 is arranged slidable in axial direction. By pulling the locking ring in the rearward direction the part of the bushing 34 which reaches into the opening 8 interacts with the locking ring 33 and thereby spreads the locking ring 33 in a radial direction whereby the locking rim 32 is released.

For coupling, the opening 8 of the plug 2 is moved in a first step over the tubular section 31 of the socket 3. Due to the geometry of the opening 8 and the tubular section 31 the housings 5, 20 are axially aligned with respect to each other. In a second step, by pushing the plug 2 in the direction of the socket 3 on the inside, the first ferrule 7 is getting in contact with the alignment sleeve 27 forming the funnel shaped mouth opening 28 and thereby is pre-aligned (coarse alignment) in a second stage (first stage alignment takes place via the interaction between the housing 5, 20 of the plug 2 and the socket 3). In a third step, the guiding pins 15 are pushed into the guiding holes 30 (third stage alignment). Thereby, the precision is even increased. In a fourth step, ferrules 7, 23 are moved against each other until their front faces, respectively the end surfaces of the optical fibers (both not shown), are pressed against each other such that information can be transmitted across the interface.

To prevent unwanted rotation between the plug 2 and the socket 3, the tubular section comprises two notches 35 arranged opposite to each other which during coupling of the plug 2 and the socket 3 match with two corresponding noses 36 arranged at an outer surface of the retainer 6 in the opening 8 of the plug housing 5.

FIG. 3 shows the connector according to FIGS. 1 and 2 in an exploded view. The process of assembly of the plug 2 and the socket 3 takes place along centre axis 4. The process of interconnecting of the plug 2 and the socket 3 is schematically indicated by dashed line 18.

FIG. 4 shows a second embodiment of an optical connector assembly 1 according to the invention. With respect to the principle setup and operation it is referred to the explanations made in connection with the embodiment as shown and described in the FIGS. 1 to 3. In difference to the above described embodiment in the embodiment shown in FIG. 4 the second ferrule 23 is arranged not only deflectable in lateral direction (y, z-direction) but also in longitudinal direction (x-direction) against the force of a second spring 19. The first and the second spring 9, 19 are both supported at their rear end by the first and the second crimp neck 10, 24. The movement in lateral direction and defined swivelling is provided by the holding sleeve 29 as described above.

Figure 5:
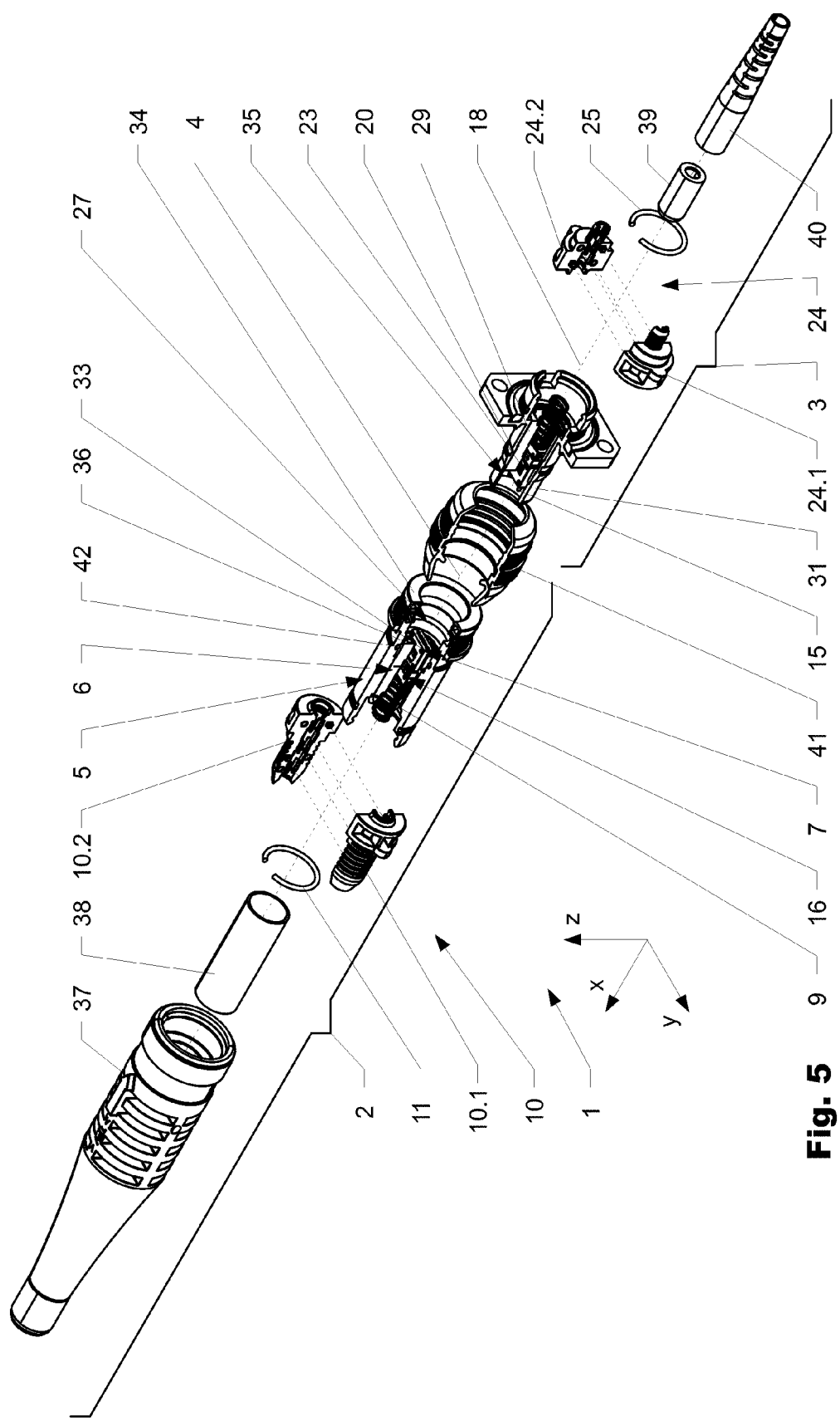
FIG. 5 is a third embodiment of a plug and a socket according to the invention in an exploded view.
Figure 6:
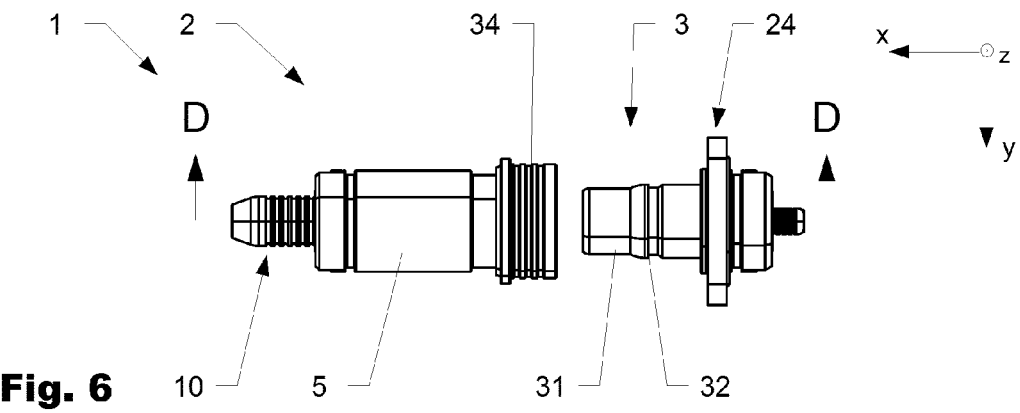
FIG. 6 is the plug and the socket according to FIG. 5 in a top view.
Figure 7:
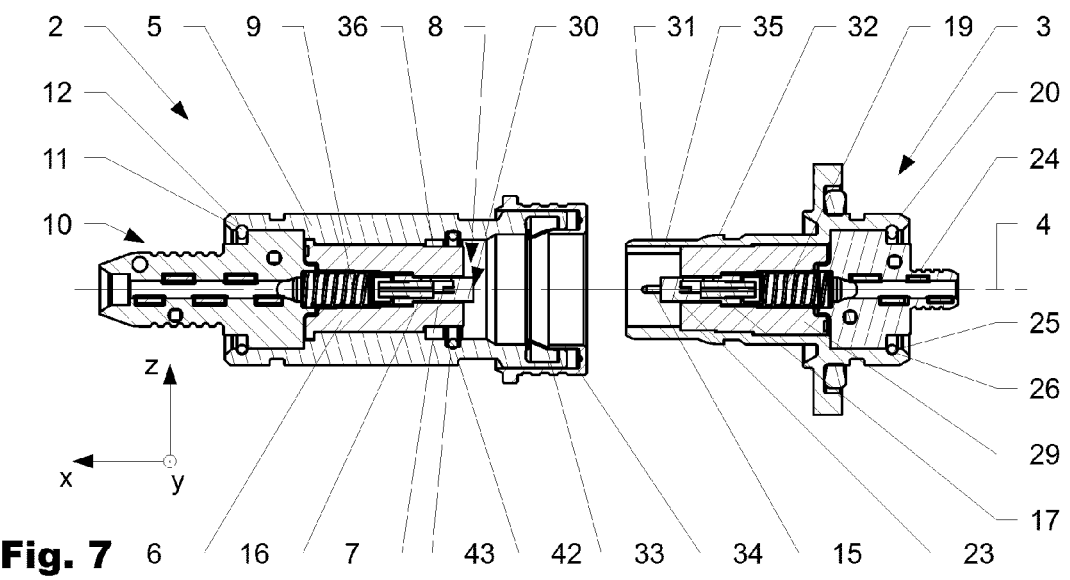
FIG. 7 is a section view along section line DD according to FIG. 6.

FIG. 5 shows a third embodiment of an optical connector assembly 1 in an exploded manner. FIG. 6 shows the optical connector assembly 1 in a top view. FIG. 7 shows a section view along section lined DD according to FIG. 6. Regarding the principle explanation which also applies similarly to this embodiment reference is made to the explanation above. In difference to the previously described first and second embodiments the optical connector assembly 1 further comprises an outer casing 37 which in an assembled position encompasses the housing 5 of the plug 2. Furthermore a first crimp sleeve 38 is visible which in an assembled position as shown in FIG. 7 sits on the first crimp neck 10 and there between clamps an outer jacket of a cable (not shown). Also in this embodiment the a crimp neck 10 of the plug 2 and the crimp neck 24 of the socket 3 have a two part form comprising an upper and a lower part which in a mounted position encompass an optical fiber. The assembly of the upper an the lower parts 10.1, 10.2 of the first crimp neck 10 and the upper and the lower parts 24, 24.2 of the second crimp neck 24 are indicated by dashed lines. As second crimp sleeve 39 is present which in the assembled position sits on the second crimp neck 24 and there between clamps an outer jacket of a cable (not shown). Furthermore a bend protection 40 is present which is pushed over the second crimp sleeve 39 and protects the cable mentioned above. A cover 41 sits in the assembled position on the front end of the plug 2 and protects the connector assembly 1 from the environment. In FIGS. 6 and 7 the outer casing 37, the first and the second crimp sleeve 38, 39, the bend protection 40, as well as the cover 41 are not shown.

For coupling, the opening 8 of the plug 2 is moved in a first step over the tubular section 31 of the socket 3. Due to the geometry of the opening 8 and the tubular section 31 the housings 5, 20 and the first and the second ferrule 7, 23 are axially aligned with respect to each other (coarse alignment). The orientation is secured by the interaction of the notch 35 and the nose 36. In a second stage the guiding pins 15 are pushed into the guiding holes 30. Thereby, the precision is even increased. In a further step, ferrules 7, 23 are moved against each other until their front faces, respectively the end surfaces of the optical fibers (not shown in detail), are pressed against each other such that information can be transmitted across the interface. The force by which they are pressed against each other depends mainly on the compression of the first and the second spring 9, 19.

A seal 42 is arranged in a circumferential notch 43 of the inside the opening 8 of the housing 5 of the plug 2. In coupled position as shown in FIG. 4 the seal 42 interacts with the tubular section 31 of the socket 3 and thereby seals the inside of the connector against the environment.

Rather, the words used in the specification are words of description rather than limitation, and it is understood that various changes may be made without departing from the Spirit and scope of the invention.

The invention claimed is:

1. An optical connector assembly (1) comprising:
    a plug (2) and a socket (3) which are interconnectable to each other in an axial direction (x) wherein
    a. the plug (2) comprises a plug housing (5) in which a first ferrule (7) is arranged and
    b. the socket (3) comprises a socket housing (20) in which a second ferrule (23) is arranged,
    c. wherein at least one of the first and second ferrules (7, 23) is arranged deflectable in the direction of a connector axis (4, x) against the force of a spring (9, 19) and
    d. at least one of the first and second ferrules (7, 23) is arranged deflectable in a lateral direction (y, z) with respect to the connector axis (4, x);
    first alignment features (27) within one of the plug housing (5) or the socket housing (20), and for coarse alignment of one of the first and second ferrules (7, 23) with respect to the other of the first and second ferrules (7, 23) in a first step during coupling; and
    second alignment features (15, 30) within at least one of the plug housing (5) or the socket housing (20), and for fine alignment of one of the first and second ferrules (7, 23) with respect to the other of the first and second ferrules (7, 23) in a second step during coupling.

2. The connector assembly (1) according to claim 1, wherein the alignment features (27) for coarse alignment include a funnel shaped mouth opening (28).

3. The connector assembly (1) according to claim 1, wherein the alignment feature (15, 30) for fine alignment comprises a guiding pin (15) and a corresponding guiding opening (30).

4. The connector assembly (1) according to claim 1, wherein the alignment feature (15, 30) for fine alignment is arranged inside the alignment feature (27) for coarse alignment.

5. The connector assembly (1) according to claim 1, wherein the laterally deflectable ferrule (23) includes a holding sleeve (29) which is made out of a deformable material and/or which has a deformable structure.

6. The connector assembly (1) according to claim 5, wherein the holding sleeve (29) comprises energy absorbing material.

7. The connector assembly (1) according to claim 1, wherein at least one of the first and second ferrule (7, 23) is supported from behind directly or indirectly by a crimp neck (10, 24).

8. The connector assembly (1) according to claim 1, wherein a spring (9, 19) is arranged between the crimp neck (10, 24) and the ferrule (7, 23).

9. The connector assembly (1) according to claim 1, wherein the socket (3) comprises a locking rim (32) and the plug (2) comprises a locking ring (33) which engages behind the locking rim (32) during coupling of the plug (2) and the socket (3).

10. The connector assembly (1) according to claim 1, wherein a crimp neck (10, 24) includes a two part form comprising an upper and a lower part which in a mounted position encompass an optical fiber.

11. A plug (2) suitable to be used in an optical connector assembly (1) according to claim 1.

12. A socket (3) suitable to be used in an optical connector assembly (1) according to claim 1.

* * * * *